United States Patent [19]
Ivner et al.

[11] Patent Number: 6,052,293
[45] Date of Patent: Apr. 18, 2000

[54] CONVERTER DEVICE FOR CONNECTION BETWEEN A SINGLE-PHASE SIDE ON A SINGLE OR MULTI-PHASE SIDE

[75] Inventors: Sven Ivner; Tommy Lejonberg, both of Västerås, Sweden

[73] Assignee: DaimlerChrysler AG, Stuttgart, Germany

[21] Appl. No.: 09/091,100

[22] PCT Filed: Dec. 11, 1996

[86] PCT No.: PCT/SE96/01632

§ 371 Date: Jun. 12, 1998

§ 102(e) Date: Jun. 12, 1998

[87] PCT Pub. No.: WO97/22174

PCT Pub. Date: Jun. 19, 1997

[30] Foreign Application Priority Data

Dec. 14, 1995 [SE] Sweden .................................... 9504468

[51] Int. Cl.[7] ................................. H02M 5/40; H02J 3/34
[52] U.S. Cl. ............................................ 363/36; 363/65
[58] Field of Search .................................. 363/36, 34, 35, 363/65, 67, 148, 149, 71

[56] References Cited

U.S. PATENT DOCUMENTS

| | | | |
|---|---|---|---|
| 3,823,362 | 7/1974 | Bailey | 363/72 |
| 3,970,914 | 7/1976 | Salzmann et al. | 363/45 |
| 4,533,987 | 8/1985 | Tomofuji et al. | 363/36 |
| 4,866,592 | 9/1989 | Fujii et al. | 363/98 |
| 4,978,894 | 12/1990 | Takahara | 318/768 |
| 5,109,327 | 4/1992 | Griffin | 363/36 |
| 5,159,261 | 10/1992 | Kim et al. | 323/360 |
| 5,307,259 | 4/1994 | Hugel et al. | 364/176 |

FOREIGN PATENT DOCUMENTS

| | | |
|---|---|---|
| 0 370 207 A1 | 5/1990 | European Pat. Off. . |
| 39 15211 A1 | 11/1990 | Germany . |
| WO 91/11841 | 8/1991 | WIPO . |

*Primary Examiner*—Adolf Deneke Berhane
*Attorney, Agent, or Firm*—Pollock, Vande Sande & Amernick

[57] ABSTRACT

A device for converting current and voltage between a first single-phase side and a second single- or multi-phase side is provided. At least two converter modules are connected between these sides. Each converter module has two converters interacting with one of the sides and an intermediate link interconnecting them. The converter modules are connected in series on the first side.

19 Claims, 2 Drawing Sheets

CONVERTER DEVICE FOR CONNECTION BETWEEN A SINGLE-PHASE SIDE ON A SINGLE OR MULTI-PHASE SIDE

FIELD OF THE INVENTION

The present invention relates to a device for converting current and voltage between a first single-phase side and a second singe- or multi-phase side, which comprises at least two converter modules connected between these sides and each having two converters interacting with one of the sides each and an intermediate link interconnecting them.

In order to illustrate but not in any way restrict the invention two fields of use of such devices will hereinafter be described, but it is emphasized that a number of other fields of use for such devices are conceivable within the scope of the invention.

A first such field of use of such a device is in a so called power convertor station, placed along lines for electric railway traffic, primarily railway lines, so as to convert or transform voltage and current of a three-phase supply line to single phase having a suitable frequency and voltage of a single phase supply line for providing electrical energy to the vehicles driven on the railway. Such a device may have two converter modules, which at the second side are through the secondary winding of a transformer connected to the three phases of the three-phase supply, the transformer being adapted to carry out a transformation of the alternating voltage from, for example about 20 kV to for example, about 1–3 kV. The converter at the second side of the respective converter module causes a rectifying and this direct voltage is then led to a number, for instance four, converters connected in parallel between the direct voltage potentials of the intermediate link. The converters are controlled by pulse with modulation to emit an alternating voltage, formed by alternating positive and negative voltage pulses, which are added through primary windings of a transformer, the secondary winding of which is connected to the railway supply line and ground. The converters of the single-phase side are then controlled to produce an alternating current having a desired frequency, usually 16⅔ Hz, while the three-phase supply line have a frequency of 50 Hz. Through the transformer on the single-phase side a voltage addition takes place while simultaneously obtaining a stair case curve shape, which will come closer to a sinus shape the greater is the number of converters arranged at the first side. A voltage adaption also takes place, so that the voltage at the single-phase side usually will be about 16 kV. The two transformers also ensure galvanical separation between the converter modules and between the single-phase and the multi-phase side.

Another field of use for a device defined in the introduction is in an electrically driven vehicle, such as a locomotive. Such devices already known for this field of use have had a single converter module, which have been connected to the single-phase supply line through a transformer, the transformer transforming the voltage down from for example 16 kV to 3 kV, and converters in the form of three-phase-bridges have been connected in parallel at the second side of the converter module and connected to a three-phase motor each for driving the vehicle.

Although these already known devices function well, it would of course be desirable to simplify them for cost saving.

SUMMARY OF THE INVENTION

The object of the present invention is to provide a device of the type mentioned in the introduction, which is simpler and primarily may be manufactured at a lower cost than similar devices already known, without lowering the requirements of a good function of the device.

This object is according to the invention obtained by connecting the converter modules in series on the first side. Because to such a connection in series of the converter modules is made, no transformer is needed at the first side for adding voltages to achive a good curve shape when the device is used. The converters at the first side function as inverters and in the opposite case, i.e. when the latters function as rectifiers no transformer is needed either at the first side for transforming down the voltage to a desired level, since a voltage division to the different converter modules will now take place. Thus, the main advantage of the invention is that no transformer is needed any longer in such a device for co-operation with the first single-phase side, which results in a considerably costs saving as compared with to such devices according to the prior art.

According to a preferred embodiment of the invention the second side is a multi-phase side, the number of converter modules of the device is a multiple of the number of phases of the second side, and each converter module is adapted to co-operate through single converter thereof with the phase of this side and just as many converter modules are adapted to co-operate with each phase of the other side. The load on the phase of a multi-phase side will in this way be symmetrical with the same number of levels per phase as the number of converter modules connected to the respective phase. A balanced load is in this way obtained on a multi-side, being, usually a three-phase network.

According to another preferred embodiment of the invention the second side is a multi-phase side, the number of converter modules of the device is a multiple of the number of phases of the second side, and each converter module is adapted to co-operate through single converter thereof with one phase of this side and the same number of converter modules are intended to co-operate with each phase of this second side. This embodiment constitutes an alternative way to achieve balancing, which is in this case obtained irrespective of the number of converter modules, so that there is no requirement that these are a multiple of the number of phases.

According to a further preferred embodiment of the invention the converters of the converter modules co-operating with the second side are adapted to co-operate with the second phase side through a transformer by being connected to the secondary winding thereof. In the two embodiments last mentioned, in the first one the transformer has at least a primary and a secondary winding per phase and each converter of the converter modules co-operating with the second phase side is connected to single such secondary winding of its own belonging to a phase of the second side with the secondary windings galvanically separated from each other, and in the second embodiment the transformer has at least a primarily and a secondary winding per phase and each branch of the bridge is connected to such a secondary winding belonging to a phase of the second side with secondary windings belonging to different converter modules galvanically separated from each other. Thanks to these constructions of the transformer the two embodiments mentioned previously are enabled while ensuring the mutually galvanical separation of the different converter modules required, which is necessary for enabling connection in series. The definition of "the transformer" is intended to cover that a plurality thereof are arranged, since the galvanical separation may take place either by separating the secondary windings in single and the same transformer or by using separate transformers.

According to another preferred embodiment of the invention, the converters of the converter modules are adapted to enable transmission of power in both directions between the first and second side, i. e. to function both as rectifiers and inverters. This embodiment is preferable and it may be achieved by using conventional controllable semiconductor switching elements, such as thyristors that may be turned off (GTO's) and bipolar transistors with an insulated gate (IGBT's) but it is within the scope of the invention to use conventional thyristor or diode rectifiers as converters of the second side in the case that only power transmission from the second to the first side is necessary.

According to another preferred embodiment of the invention the first side is formed by a single-phase railway supply line for vehicles electrically driven, the second side is formed by a three-phase supply line and the device is a part of a power convertor station for delivering electrical energy from the three-phase line to the single-phase line or conversely. Accordingly, such a device makes it possible to obtain a good curve-shape of the single-phase side if the modulation patterns for the different converters of this side have a suitable mutual phase shift and the output voltages thereof are after that added by a series connection, which accordingly is possible in this case without any transformer on the single-phase side. The more converter modules used the better will the curve-shape be and the higher in the frequency interval will the harmonics generated be located, which means that the problem to take care thereof is reduced.

According to another preferred embodiment of the invention the converters of the converter modules co-operating with the second side are connected to an electrical motor each forming the second side. It is by that possible to drive a plurality of electrical motors through a single-phase side without any transformer being necessary for bringing the voltage to a level suitable for the motors, since the connection in series according to the invention obtains a division of the voltage of the single-phase side of the different converter modules to a suitable level. Thus, vehicles, such as railway engines, having no transformers may be built.

According to another preferred embodiment of the invention the respective converters of the converter modules co-operating with the second side are formed by a bridge having a plurality of branches, which are each connected to a phase winding each of a motor separate for each converter module and having a number of phases corresponding to such plurality. The separate electrical motor may in this way be driven by each converter module, the motor being preferably of the three-phase type, so that the bridge has three branches, i.e. is a three-phase bridge, and a suitable voltage level for the motors may be achieved by the voltage division obtained by the connection in series at the first side.

It is of course possible, which is indicated in another embodiment of the invention, that the converters of the converter modules co-operating with the second side are connected each to a phase winding of an electrical motor belonging to the second side, so that for example three converter modules are arranged for transferring electrical energy to single three-phase motor or receiving energy therefrom when it is slowed down.

Further advantages and advantageous characteristics of the invention will appear from the following description as well as the other dependent claims.

BRIEF DESCRIPTION OF THE DRAWINGS

With reference to the appended drawings, below follows a description of preferred embodiments of the invention cited as examples.

In the drawings.

DETAILED DESCRIPTION OF PREFERRED EMBODIMENTS

Figure 1:
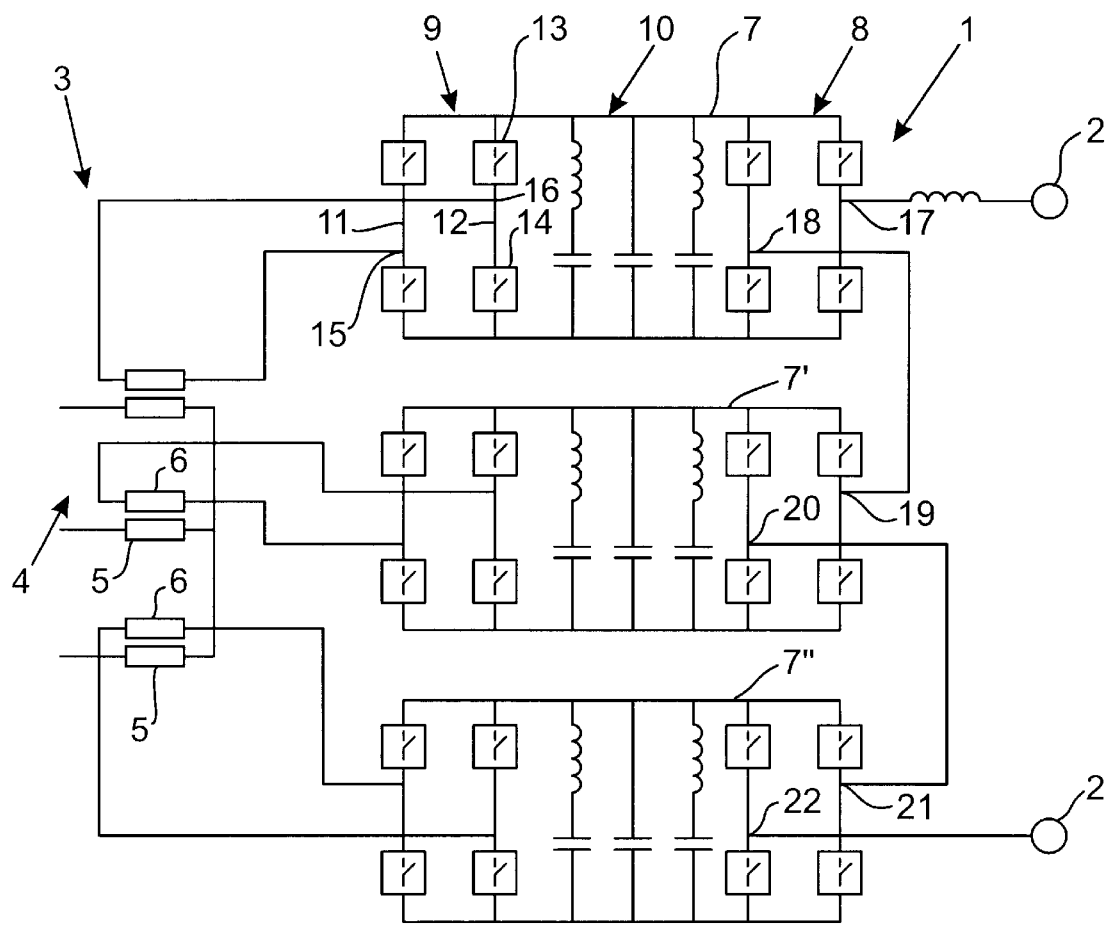
FIG. 1 is a circuit diagram illustrating a device according to a first preferred embodiment of the invention.

A device for converting current voltage between a first one-phase side 1, which is illustrated through two terminals 2, and a second three-phase side 3 is illustrated in FIG. 1. Such a device is suited for being a part of a power converter station for delivering electrical energy from a three-phase line to a single-phase railway supply line for electrically driver vehicles or conversely. The device has at the second side a transformer 4, with three primary windings 5, single for each phase, and three secondary windings 6 galvanically separated from each other. Thus, the transformer is arranged to transform the alternating voltage of one phase to an alternating voltage of another level through each couple of primary winding/secondary winding. In the case of a power converter station of the type mentioned, the voltage of the three-phase line is about 20 kV, and this is transformed to about 2,5 kV alternating voltage between the ends of the respective secondary winding, so that the components arranged in the converter modules described hereinafter will not be damaged.

The device also comprises three converter modules 7, one for each phase, each module consisting of a first converter 8 cooperating with the single-phase side 1, a second converter 9 co-operating with the three-phase side, and an intermediate link 10 arranged therebetween and formed by capacitors and induction coils and being here of the type making the converter modules voltage-stiff. The term "converters" is here defined as a means being able to function as an inverter and/or a rectifier. The transformer ensures a galvanical separation required of different converter modules. Galvanical connection may only take place in single point, namely between the different converters on the first side (see the description further below of this embodiment and the single according to FIG. 2).

Each converter is formed by a bridge having two branches 11, 12, which by a man skilled in the art are called phases, but they are here called branches for avoiding confusion. Each such branch has two controllable semiconductor switching devices 13, 14 in series, which in their turn are called branches by the men skilled in the art. The different semiconductor switching devices have a controllable switching element, and preferably a free-wheeling diode connected anti-parallelly thereto. The controllable semiconductor switching element may advantageously be a turn-off thyristor, a so called GTO, or a bipolar transistor with an insulated gate, a so called IGBT. Each converter branch 11, 12 is provided with a branch output 15, 16 in a point between these two devices 13, 14, and single branch output of the second converters 9 is connected to single side of the respective secondary winding and the other branch output to the other side thereof. By controlling the semiconductor switching devices at the second converter of the respective converter module in a conventional way, a rectifying of the alternating voltage connected thereto is obtained, so that a direct voltage is achieved over the respective intermediate link 10. This direct voltage will in the case mentioned above, be about 3 kV. The intermediate link smoothes out and filtrates the direct voltage, by absorption of the energy pulsations, which are related to the frequency of the alternating current networks, especially of the single-phase side, by the components thereof.

The first converters 8 are constructed in the same way as the second converters 9, but a branch output 17 of a first of the converter modules is connected to the single-phase line, the second branch output 18 is connected to a first branch output 19 of the first converter of a second converter module 7', the second branch output 20 of which is connected to a first branch output 21 of the first converter of the third converter module 7", and finally a second branch output 22 of this converter is connected to ground 2. Thus, a connection in series of the single-phase side of the converter device is obtained. The semiconductor switching devices of the first converter are preferably controlled by means of pulse with modulation to deliver positive or negative rectangular pulses of the direct voltage of the intermediate link 10 or zero voltage pulses. By giving the pulses determined by the different first converters a suitable mutual displacement using suitable modulation patterns, the voltages added through the connection in series will have a staircase shape on the single-phase 1. The peak value thereof will in the present case be about 9 kV. Accordingly, the connection in series of the single-phase side of the converter modules makes a voltage addition without any existence of any transformer possible. The converters are preferably designed to enable transferring of electrical energy in both directions, although this is not absolutely necessary, but in the case feeding is only intended to take place in single direction the converters arranged on the input side may be formed by for example conventional thyristor rectifiers, which accordingly may not function as inverters.

It is possible to provide the device with another number than three converter modules, and a connection will then take place in the way shown in FIG. 1 with just as many secondary windings as the number of converter modules so as to achieve galvanical separation of the second converters in the different converter modules, in which the number of converter modules is preferably a multiple of three for obtaining a symmetrical load on the three-phase network. However, it would theoretically of course be possible to have other numbers of converter modules, but a desired symmetrical load is then not obtained. The desired voltage at the single-phase side at a given maximum voltage taken by the semiconductor switching elements of the converter modules may in this way be obtained by a suitable choice of the number of converter modules. The greater number of converter modules means also a better curve shape on the single-phase side. It would for example be appropriate to have six converter modules with a voltage of about 2,7 kV per module in the case mentioned above for obtaining a single-phase voltage of about 16 kV.

It would as an alternative however also be possible to replace the converters of the three-phase side shown in FIG. 1 by conventional thyristor rectifiers connected to a three-phase winding each or so called three-phase bridges, i.e. bridges having three branches, which each are connected to a phase each of the three-phase side. Symmetry in the load upon the three-phase network is in this way achieved independently of the number of converter modules, through which the number of converter modules in some cases could be lower than in devices of the same type as that shown in FIG. 1, when there is a requirement to have such a load symmetry.

Figure 2:
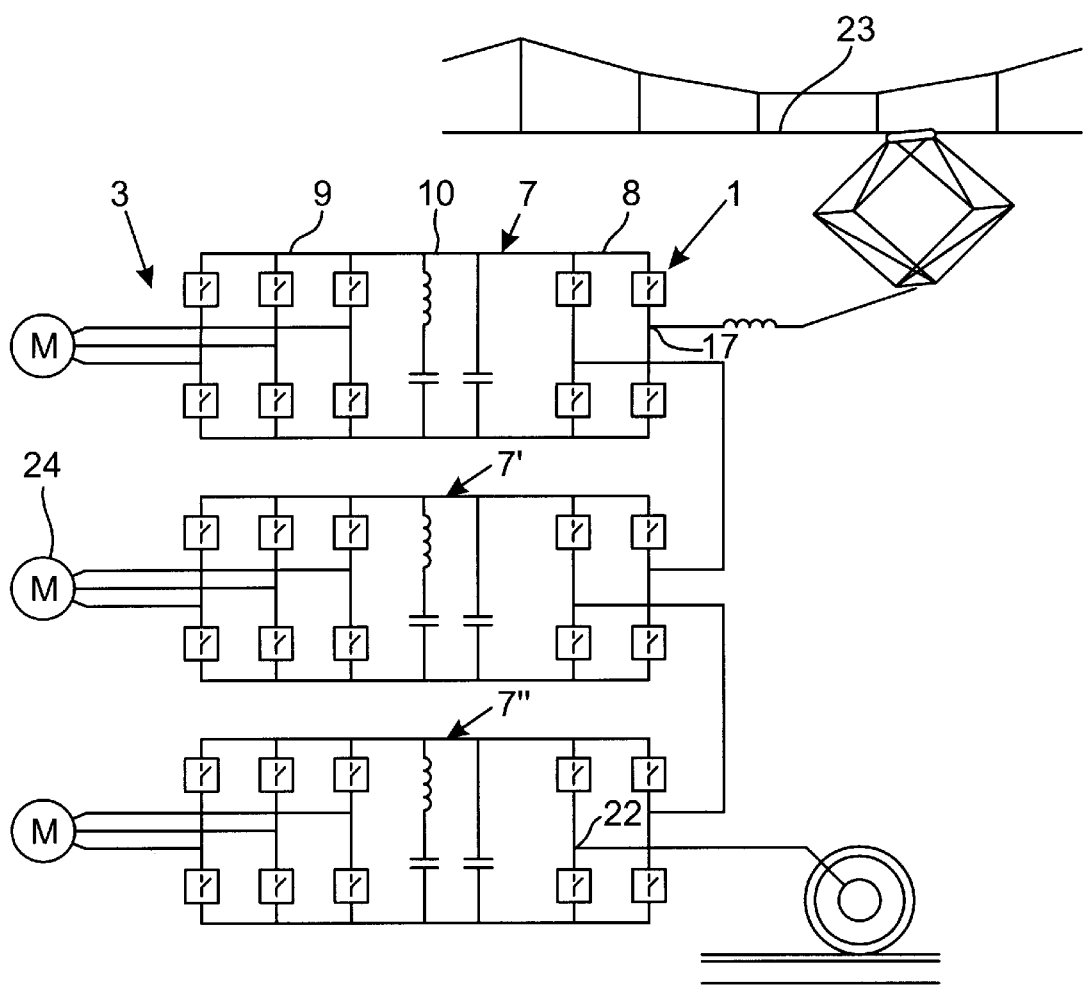
FIG. 2 is a circuit diagram illustrating a device according to a second preferred embodiment of the invention.

The device has in the embodiment shown in FIG. 1 two line sides, while FIG. 2 illustrates a device according to a second preferred embodiment of the invention having a line- and a machine side and in which parts corresponding to parts of the device shown in FIG. 1 are provided with the same reference numerals. The connection in series of the single-phase side 1 of the converter modules is here achieved in the same way as in FIG. 1. The device is here intended to be arranged in an electrically driven vehicle intended to receive energy from a single-phase railway supply line 23. This may for example have a voltage of 16 kV. Thus, the first branch output 17 is in this case connected to the single-phase railway supply line, while the branch output 22 of the third converter module is connected to ground. The voltage division on the respective converter modules is in this way obtained without any transformer, which is to compare with the case in conventional such vehicles, in which a transformer has to be arranged so as to transform down the voltage to a suitable level in the single converter module. The converters 9 of the second side of the device are formed by so called three-phase bridges, i.e. they have here three branches of the type defined above, and each branch output is connected to a phase-winding of a three-phase motor 24. The motors 24 may in this way receive electrical energy from the railway supply line 23 and drive the vehicle. Conventional thyristor converters may in this case not be used on the motor side, but converters having components that may be turned off are required, since normal alternating current motors may not form the electromotive force needed for commutation of a converter bridge. By arranging a plurality of converter modules and connect the single-phase side thereof series in the motors of a vehicle fed through a single-phase railway supply line may in this way receive driving force with the correct voltage level without using any transformer. The motors have been given an isolation level adapted to the total connection voltage.

In a modification of the embodiment according to FIG. 2 the converter of each converter module located at the second side 3 could be connected to only single phase winding of a motor, which could be driven through a plurality of converter modules. It would then also be possible to arrange for example six converter modules for driving two three-phase motors.

The invention is of course not in any way restricted to the preferred embodiments described above, but several possibilities of modifications thereof would be apparent to a man skilled in the art without departing from the basic idea of the invention.

Besides the possible modifications of the device according to the invention mentioned above, it may here also be added that the number of phases of the second side of course may be arbitrary, although it would in practice most often be constituted by a three-phase side. Thus, it could well be a single-phase side, and it is not at all necessary that the device produces another frequency of the alternating voltage output than of the alternating voltage input.

We claim:

1. A device for converting current and voltage between a first single-phase side and a second single- or multi-phase side comprising at least two converter modules connected between the first and second sides, each module having two converters each interacting with single of the sides and an intermediate link interconnecting the converters, the converter modules being connected in series at the first side.

2. A device according to claim 1 wherein the second side is a multi-phase side, the number of converter modules corresponds to the number of phases of the second side, and each of said second side is intended to have a converter co-operating therewith.

3. A device according to claim 1 wherein the second side is a multi-phase side, the number of converter modules is a multiple of the number of phases of the second side, and each converter module is adapted to co-operate through one converter thereof with one phase of said second side and the same number of converter modules co-operate with each phase of said second side.

4. A device according to claim 1 wherein the second side is a multi-phase side, the converter of each converter module co-operating with said second side is formed by a bridge having as many branches as the number of phases of said second side, and the branches of each said bridge each co-operate with a phase of the second side.

5. A device according to claim 4 wherein the converters of the converter modules co-operating with said second side are adapted to co-operate with the second side through a transformer by being connected to a secondary winding thereof.

6. A device according to claim 5 wherein the transformer has at least a primary and secondary winding for each phase, and each converter of the converter modules co-operating with said second side is connected to a separate secondary winding with the secondary windings being galvanically separated from each other.

7. A device according to claim 4 wherein the transformer has at least a primary and a secondary winding for each phase, and each branch of said bridge is connected to a separate secondary winding with the secondary windings belonging to different converter modules galvanically separated from each other.

8. A device according to claim 1 wherein the converters of the converter modules are designed to enable transfer of power in both directions between the first and second side, whereby to function both as rectifiers and inverters.

9. A device according to claim 1 wherein each converter includes at least two branches connected in parallel between the direct current voltage potentials of the converter module including connected in series two controllable semiconductor switching devices and each converter branch is provided with a branch tap at a point between said two switching devices.

10. A device according to claim 9, wherein each of said controllable semiconductor switching devices is formed by a controllable semiconductor switching element and a free-wheel diode connected in anti-parallel therewith.

11. A device according to claim 9 wherein the converter modules are connected in series at the first side by a connection of a second branch tap of the respective converter in a first converter module to a first branch tap of a converter in a second converter module and so on, and the total output voltage from the converter modules connected in series is obtained between the first branch tap of the converter of the first converter module and the second branch tap of the converter of a last converter module.

12. A device according to claim 1 wherein the first side is formed by a single-phase railway supply line for electrically driven vehicles.

13. A device according to claim 5 wherein the second side is formed by a three-phase supply line, and the device is a part of a power converter station for delivering electrical energy from the three-phase line to the single-phase line or conversely.

14. A device according to claim 1 wherein the converters of the converter modules co-operating with the second side are connected to an electrical motor.

15. A device according to claim 14, wherein the converters of the converter modules co-operating with said second side are each formed by a bridge having a plurality of branches, each branch connected to a phase winding of a motor being separate for each converter module with a number of phases corresponding to said plurality.

16. A device according to claim 1 wherein the converters of the converter modules co-operating with said second side are each connected to a phase winding of an electrical motor belonging to said second side.

17. A device according to claim 12, adapted to be arranged in a vehicle for driving the motor/motors and by that the vehicle through the railway supply line and wherein one end of the series connection of the converter modules is adapted to be directly, without any intermediate transformer, connected to the railway supply line and the second end thereof is adapted to be connected to ground.

18. A device according to claim 1 wherein the second side is a three-phase side.

19. A device according to claim 1 wherein the converter modules are of a voltage-stiff type.

* * * * *